US007682651B2

(12) United States Patent
Martins et al.

(10) Patent No.: US 7,682,651 B2
(45) Date of Patent: Mar. 23, 2010

(54) METHOD FOR MANUFACTURING DISPLAY DEVICE

(75) Inventors: Ricardo Jorge de Albuquerque Martins, Tokyo (JP); Toshihiko Takeda, Atsugi (JP); Tomonari Horikiri, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1415 days.

(21) Appl. No.: 11/073,670

(22) Filed: Mar. 8, 2005

(65) Prior Publication Data
US 2005/0231795 A1 Oct. 20, 2005

(30) Foreign Application Priority Data
Mar. 9, 2004 (JP) .............................. 2004-066387
Jan. 27, 2005 (JP) .............................. 2005-020180

(51) Int. Cl.
*B05D 5/06* (2006.01)
*C08F 2/46* (2006.01)
(52) U.S. Cl. ........................... 427/58; 427/508; 427/516
(58) Field of Classification Search .................. 427/58, 427/508, 516, 547, 550; 359/296
See application file for complete search history.

(56) References Cited
U.S. PATENT DOCUMENTS
6,525,865 B2    2/2003   Katase ....................... 359/296

| 2002/0042152 A1* | 4/2002 | Yamazaki et al. ............... 438/4 |
| 2003/0152849 A1* | 8/2003 | Chan-Park et al. ............. 430/22 |
| 2004/0012749 A1* | 1/2004 | Freeman ....................... 349/155 |
| 2005/0088079 A1* | 4/2005 | Daniels ......................... 313/504 |

FOREIGN PATENT DOCUMENTS
JP    2001-343672    12/2001

* cited by examiner

*Primary Examiner*—Timothy H Meeks
*Assistant Examiner*—Jimmy Lin
(74) *Attorney, Agent, or Firm*—Fitzpatrick, Cella, Harper & Scinto

(57) ABSTRACT

A method for manufacturing a display device, having hollows containing fine particles, for displaying an image using the fine particles includes a step of packing a dispersion in the hollows, the dispersion containing the fine particles, a dispersion medium, and a precursor, dissolved or dispersed in the dispersion medium, for forming a sealing layer; a step of providing a support layer on partitions; a step of coating a face of the support layer and end portions of the partitions with the sealing layer precursor by allowing the face of the support layer and the end portions of the partitions to adsorb the sealing layer precursor, the face of the support layer and the end portions of the partitions being in contact with the dispersion; and a step of forming the sealing layer by subjecting the resulting sealing layer precursor to at least one of polymerization and cross-linking.

6 Claims, 3 Drawing Sheets

(A)  (B)

(A)  (B)

METHOD FOR MANUFACTURING DISPLAY DEVICE

BACKGROUND OF THE INVENTION

1. Field of the Invention

The present invention relates to methods for manufacturing display devices for displaying an image by allowing fine particles to migrate. In particular, the present invention relates to a method for forming a sealing layer for hermetically sealing hollows, present on a substrate, for storing a dispersion containing such fine particles and a dispersion medium.

2. Description of the Related Art

In recent years, various display devices for displaying an image by controlling the distribution of fine particles contained in spaces have been proposed. Among these display devices is an electrophoretic display device which displays an image using fine charged electrophoretic particles that are dispersed in an insulating liquid and allowed to migrate by applying an electric field to the charged electrophoretic particles.

When the charged electrophoretic particles are dispersed in such an insulating liquid, they are apt to migrate in the in-plane direction of a substrate. Since the migration of the charged electrophoretic particles from their predetermined positions causes a deterioration in a displayed image, regions where the charged electrophoretic particles can migrate must be limited.

In order to limit such regions where the charged electrophoretic particles can migrate, the following technique has been proposed: the charged electrophoretic particles and the insulating liquid are packed in a plurality of fine hollows, present on a substrate, defined by the substrate, partitions arranged on the substrate, and a face of a support layer placed on the partitions, the support layer face being opposed to the substrate and covered with a sealing layer, the partitions having end portions that abut the support layer and are covered with a sealing layer. If the hollows are completely sealed, the charged electrophoretic particles can be confined in the hollows.

A method for manufacturing an electrophoretic display device having such a configuration will now be described.

Partitions are provided on a substrate by an etching process, an ink jet process, or an embossing process, whereby separated cells are formed. The etching process corresponds to a known photolithographic process by which such partitions are formed in such a manner that a photosensitive resist film is exposed through a mask and the resulting film is developed and then rinsed. For the ink jet process, a material for forming the partitions is gradually deposited on the substrate and then cured, whereby the partitions are formed. For the embossing process, depressions are formed in a flat plate by pressing a template against the flat plate, whereby the partitions are formed.

After the partitions are formed as described above, a mixture (hereinafter referred to as a dispersion system) of charged electrophoretic particles and an insulating liquid is packed in the cells separated from each other by the partitions. A sealing material is placed on the resulting dispersion system and then cured, whereby the dispersion system is confined in the separated cells.

A counter substrate, which is a counter part of the substrate having the partitions thereon, is joined to the cured sealing material, whereby the electrophoretic display device is obtained. The sealing material used to prepare the electrophoretic display device must not be compatible with the dispersion medium.

In another method for manufacturing the electrophoretic display device, a mixture of a dispersion system and a precursor of a sealing material is packed in separated cells by an ink jet process. The sealing material precursor is incompatible with a dispersion medium of the dispersion system and has a density less than that of the dispersion system. In this method, after partitions are formed, the sealing material precursor is separated from the dispersion system and then finally placed above the dispersion system.

After such a configuration is obtained, the sealing material precursor is cured with, for example, ultraviolet light, whereby the sealing layer is formed. This allows the dispersion system to be confined in the separated cells. A counter substrate, which is a counter part of a substrate having the partitions thereon, is joined to the resulting sealing layer, whereby the electrophoretic display device is obtained (see Japanese Patent Laid-Open No. 2001-343672 hereinafter referred to as Patent Document 1).

However, the method disclosed in Patent Document 1 has two problems described below.

The first problem is that only a limited group of materials for forming the sealing layer is possible.

The cause of this lack of freedom in the selection of materials for forming the sealing layer can be roughly divided into two factors. One of the factors is that the density of the sealing material is limited. That is; in the known method, the sealing material must have a density less than that of the dispersion system. When the dispersion system contains an isoparaffinic solvent widely used as a dispersion medium, the sealing material must have a density less than one. However, most curable materials have a density greater than one; hence, a curable material with a density of less than one is not readily available.

The other factor is that the sealing material must be curable even in the presence of oxygen because the sealing material must cured in such a manner that the sealing material is in contact with air. However, an inexpensive, soft, ultraviolet-curable resin, such as an acrylate ultraviolet-curable resin, useful in forming a sealing layer is generally cured in the absence of oxygen. If an oxygen-free atmosphere is employed, however, a special system for removing oxygen from an atmosphere in which the sealing material is cured, must be used. These factors seriously reduce the degree of freedom in selecting the sealing material.

The second problem is that it is very difficult to uniformly form a sealing layer with a wide area.

That is because the sealing layer exposed to air has non-uniform portions. The non-uniform portions are formed because the sealing material forms droplets. In general, it is very hard to prevent the nonuniform portions from being formed. An increase in device size makes this problem more serious.

SUMMARY OF THE INVENTION

The present invention has been made to solve the above problems and provides a method for manufacturing a display device (electrophoretic display device) in which the density of a precursor of a sealing layer is not particularly limited, the sealing layer precursor may contain an ultraviolet-curable material, and/or the sealing layer can be uniformly formed.

The present invention provides a method for manufacturing a display device having hollows containing fine particles for displaying an image by controlling the distribution of the fine particles, the hollows being defined by an insulating layer placed on a substrate, a plurality of partitions arranged on the insulator, and a support layer placed on the partitions; the support layer having a face opposed to the substrate, covered with a sealing layer, and the partitions having end portions covered with the sealing layer. The method includes a step of providing a dispersion in the hollows, the dispersion containing the fine particles, a dispersion medium and a sealing layer precursor dissolved or dispersed in the dispersion medium for forming the sealing layer; a step of providing the support layer on the partitions; a step of coating the face of the support layer and the end portions of the partitions with the sealing layer precursor by allowing the face of the support layer and the end portions of the partitions to adsorb the sealing layer precursor, the face of the support layer and the end portions of the partitions being in contact with the dispersion; and a step of forming the sealing layer by subjecting the coated sealing layer precursor to at least one of polymerization and cross-linking.

According to the present invention, the sealing layer precursor, with which the face of the support layer and the end portions of the partitions are coated in the coating step, is subjected to at least one of polymerization and cross-linking, whereby the sealing layer is formed. Therefore, the density of the sealing layer precursor is not limited, the sealing layer precursor may contain an ultraviolet-curable material, and the sealing layer can be uniformly formed.

Another embodiment of the present invention provides, for a method of manufacturing a display device having hollows containing fine particles, said hollows defined by a support layer and an opposed substrate, and by opposed partitions carried by said substrate, an improvement by which a uniform hermetic seal is provided to seal the support and substrate layers and the partitions forming the hollows. This improvement comprises a step of coating the opposed support and substrate layers and end portions of the partitions with a sealing precursor, and a step of forming a uniform hermetic seal by subjecting the sealing precursor to either polymerization or cross-linking.

Further features and advantages of the present invention will become apparent from the following description of exemplary embodiments with reference to the attached drawings.

DETAILED DESCRIPTION OF THE PREFERRED EMBODIMENTS

Embodiments of the present invention will now be described with reference to the drawings.

Figure 1:
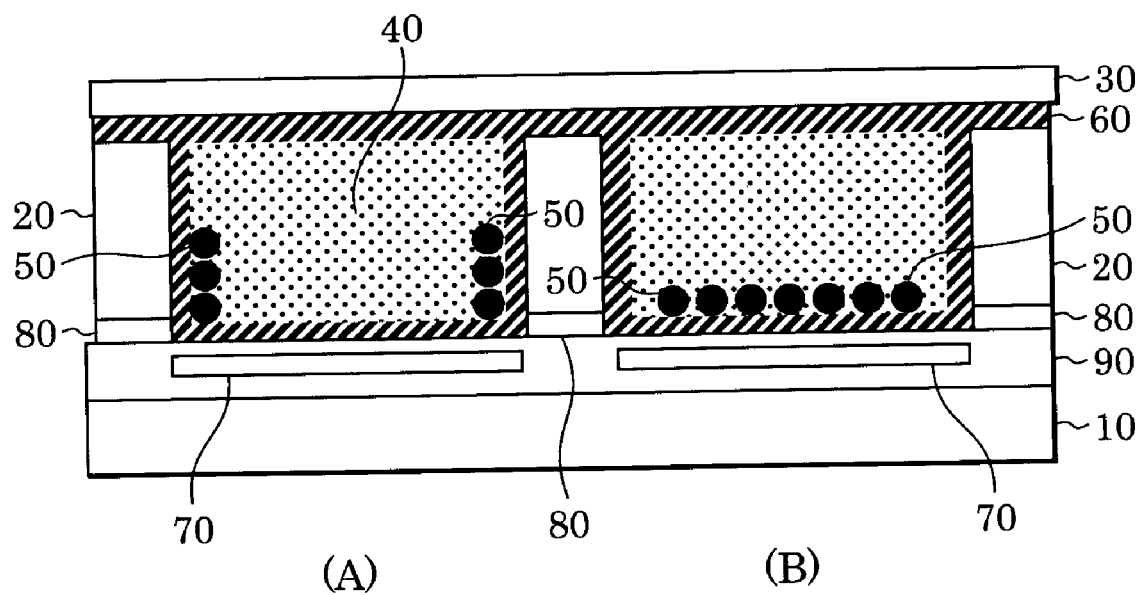
FIG. 1 is a schematic view showing a configuration of an electrophoretic display device according to a first embodiment of the present invention.

FIG. 1 is a schematic view showing an electrophoretic display device according to a first embodiment of the present invention. With reference to FIG. 1, reference numeral 10 represents a substrate, reference numeral 90 represents an insulating layer placed on the upper face of the substrate 10, and reference numeral 20 represents partitions that are arranged on the insulating layer 90 so as to form a grid pattern. Portions surrounded by the partitions 20 may have a quadrilateral or circular shape.

Reference numeral 30 represents a support layer that is placed on the partitions 20 and located close to the display surface of the electrophoretic display device. The partitions 20 are sandwiched between the insulating layer 90 and the support layer 30. Hollows surrounded by the support layer 30, the insulating layer 90, and the partitions 20 are filled with a dispersion containing a dispersion medium 40 and charged electrophoretic particles 50. Reference numeral 70 represents first electrodes and reference numeral 80 represents a second electrode.

Reference numeral 60 represents a sealing layer having portions for covering all walls of the hollows. In this embodiment, the sealing layer 60 extends between the support layer 30 and the partitions 20.

The electrophoretic display device displays an image by controlling the distribution of the charged electrophoretic particles 50. With reference to FIG. 1, in regions represented by (A), the charged electrophoretic particles 50 are gathered close to the partitions 20. In this case, when regions (A) are observed through the support layer 30, regions (A) appear white if the first electrodes 70 or the insulating layer 90 is white. If the first electrodes 70 have respective red faces, green faces, and blue faces or the insulating layer 90 has red portions, green portions, and blue portions, a color image can be displayed.

On the other hand, in regions represented by (B), the charged electrophoretic particles 50 are distributed above the substrate 10. In this case, when regions (B) are observed through the support layer 30, regions (B) appear black if the charged electrophoretic particles 50 are black.

In order to change a displayed image, the distribution of the charged electrophoretic particles 50 may be varied by allowing the charged electrophoretic particles 50 to migrate above the substrate 10. The charged electrophoretic particles 50 can be electrophoretically transferred by, for example, applying electrical signals between the first electrodes 70 and the second electrode 80. The type of force for transferring the charged electrophoretic particles 50 is not particularly limited and includes, for example, electrophoretic force, electro-hydraulic force for allowing the dispersion medium 40 to flow, or another type of force. The charged electrophoretic particles 50 may be colored rather than black.

In this embodiment, the sealing layer 60 is formed by curing a sealing layer precursor dissolved in the dispersion medium 40 for forming the sealing layer 60.

A method for manufacturing the sealing layer 60 according to this embodiment will now be described using manufacturing steps shown in FIG. 2.

[Step 1]

Step 1 includes a sub-step of packing or filling the dispersion 200 containing the sealing layer precursor 210 dispersed or dissolved in the dispersion medium 40 in the hollows defined by the insulating layer 90 and the partitions 20 and also includes sub-steps prior to the packing sub-step.

In this step, which may referred to as a dispersion-packing step, switching elements (not shown), the first electrodes 70, and the insulating layer 90 are formed on the substrate 10 by, for example, a known photolithographic process. The second electrode 80 and the partitions 20 are then formed on the insulating layer 90.

The partitions 20 are formed by, for example, a known lithographic process. In order to assist adsorption of the sealing layer precursor 210 on the partitions 20 in Step 3 described below, the partitions 20 may be surface-treated. If the sealing layer precursor 210 contains, for example, an amphipathic compound and the partitions 20 are surface-treated to be hydrophobic, then hydrophobic sites of the sealing layer precursor 210 are readily bonded to hydrophobic sites of the partitions 20. Reactive residues capable of bonding to the sealing layer precursor 210 may be provided on the partitions 20. The sealing layer precursor 210 need not be necessarily dissolved in the dispersion medium 40 contained in the dispersion 200 and may be dispersed in the dispersion medium 40.

Figure 2A:
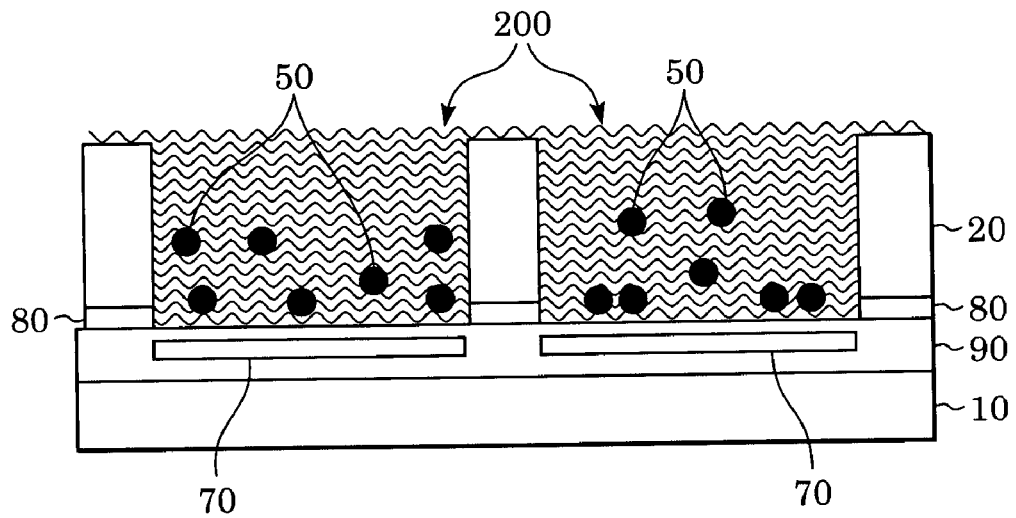
FIG. 2 is a schematic view showing steps of manufacturing the electrophoretic display device.

After the partitions 20 are formed, the dispersion 200 containing the charged electrophoretic particles 50 and the sealing layer precursor 210 are packed in the hollows as shown in FIG. 2A.

[Step 2]

Figure 2B:
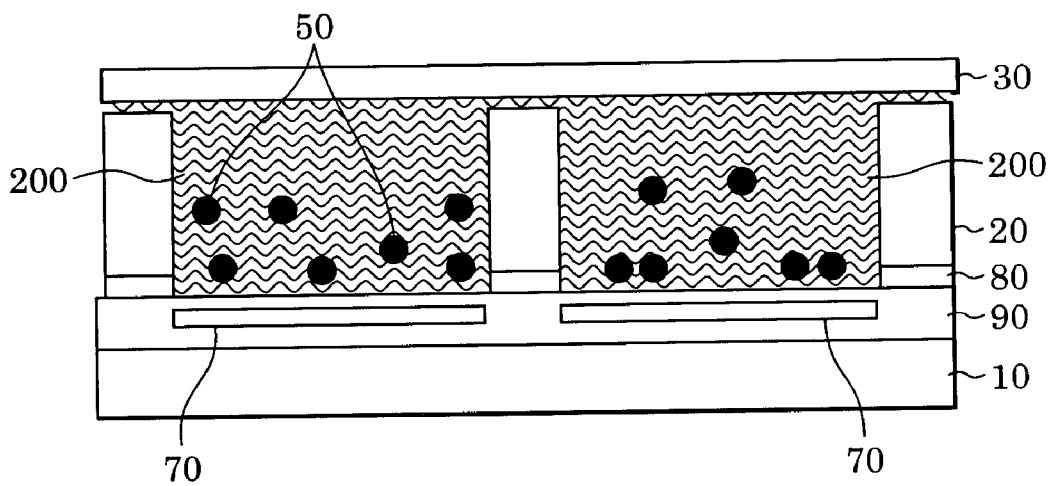

Step 2, which may be referred to as a support layer-providing step, includes a sub-step of providing the support layer 30 on the partitions 20. In this step, after the dispersion 200 is packed in the hollows, the support layer 30 is provided on the partitions 20 as shown in FIG. 2B.

In order to assist the sealing layer precursor 210 to be adsorbed on the support layer 30 in Step 3 described below, the support layer 30 may be surface-treated. If the sealing layer precursor 210 contains, for example, an amphipathic compound and the support layer 30 is surface-treated to be hydrophobic, hydrophobic sites of the sealing layer precursor 210 are readily bonded to hydrophobic sites of the support layer 30. Organic molecules capable of bonding to the sealing layer precursor 210 may be provided on the support layer 30.

Alternatively, the organic molecules may be provided on at least one of the support layer 30 and end portions of the partitions 20, the end portions being located close to the support layer 30. This treatment is effective in using the chemical adsorption described above. A technique for providing the organic molecules on at least one of the support layer 30 and the end portions of the partitions 20 is not particularly limited and a chemical technique such as covalent bonding or a physical technique such as non-covalent bonding may be used. In the present invention, a chemical technique is preferably used. Alternatively, reactive groups may be provided on at least one of the support layer 30 and the end portions of the partitions 20 by oxidation, for example, UV ashing and then bonding to the sealing layer precursor 210.

[Step 3]

Figure 2C:
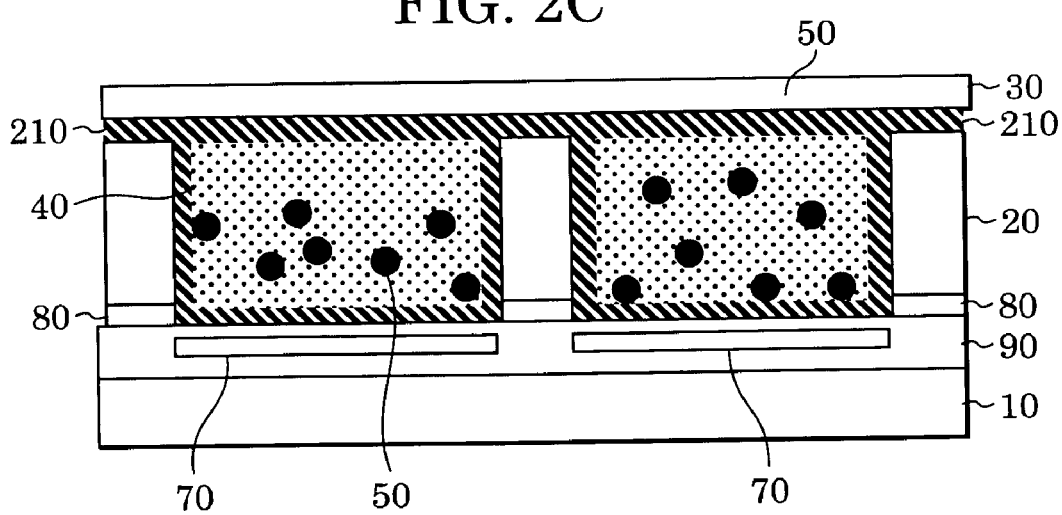

Step 3, which may be referred to as a coating step, includes a sub-step of allowing the support layer 30, the partitions 20, and the insulating layer 90 to adsorb the sealing layer precursor 210 contained in the dispersion 200 and form a coat on the support layer 30, the partitions 20, and the insulating layer 90. In this step, in particular, the sealing layer precursor 210 is adsorbed on the support layer 30, the partitions 20, and the insulating layer 90, which are in contact with the dispersion 200, because of their affinity. This allows the support layer 30, the partitions 20, and the insulating layer 90 to be coated with the precipitated sealing layer precursor 210 as shown in FIG. 2C. The sealing layer precursor 210 is present between the support layer 30 and the partitions 20.

[Step 4]

Step 4, which may be referred to as a sealing layer-forming step, includes a sub-step of solidifying the sealing layer precursor 210 to form the sealing layer 60. In this step, the sealing layer 60 is formed as shown in FIG. 1.

A technique for solidifying the sealing layer precursor 210 varies depending on the nature of the sealing layer precursor 210. When the sealing layer precursor 210 contains, for example, a polymerizable compound, the sealing layer precursor 210 may be subjected to polymerization suitable for the nature of the polymerizable compound. When the sealing layer precursor 210 contains, for example, a photopolymerizable compound, the sealing layer precursor 210 may be subjected to photopolymerization. When the sealing layer precursor 210 contains, for example, an ultraviolet-polymerizable component, the sealing layer precursor 210 may be subjected to cross-linking by the application of ultraviolet light.

In this step, the sealing layer precursor 210 is subjected to polymerization or cross-linking and bonded to the support layer 30, the partitions 20, and the insulating layer 90, whereby the sealing layer 60 is formed.

Materials for forming the electrophoretic display device of this embodiment will now be described.

The dispersion medium 40 is an insulating fluid, examples of which include organic solvents such as silicone oil, xylene, toluene, and isoparaffin (for example, Isopar™ manufactured by Exxon Mobil Corporation).

Where the size and color of the charged electrophoretic particles 50 are not required for a particular user, then any material useful in displaying a desired image can be used. The following material is preferable: a material that can be colored and positively or negatively charged in an insulating liquid. In particular, resin containing an inorganic pigment, an organic pigment, carbon black, or a mixture thereof is preferably used. The charged electrophoretic particles 50 may have an average particle size of about 0.01 to 50 μm and preferably about 0.1 to 10 μm.

The dispersion medium 40 and/or the charged electrophoretic particles 50 may contain a charge control agent for controlling the charge of the charged electrophoretic particles 50 to stabilize the charged electrophoretic particles 50. Examples of the charge control agent include succinic amide, a metal complex of a mono azo dye, salicylic acid, an organic quaternary ammonium compound, and a nigrosine compound.

The material for forming the substrate 10 is not particularly limited. Examples of such a material include soft materials such as polyethersulfone (PES), polyethylene terephthalate (PET), and polycarbonate (PC); hard materials such as glass and quartz; and other materials. When the sealing layer precursor 210 is photopolymerizable as described below, a substrate or layer (for example, the support layer 30) through which light for polymerization is applied must be light-transmissive.

A material for forming the first and second electrodes 70 and 80 is not particularly limited and any material useful in displaying a desired image can be used. Examples of such a material include aluminum (Al) and indium tin oxide (ITO). When the first electrodes 70 are used as light-reflecting layers, a material, such as silver (Ag) or Al, having high reflectivity, is preferably used. When the first electrodes 70 are used as white backgrounds, the first electrodes 70 may be treated so as to have irregular surfaces for scattering light or light-scattering layers may be provided on the first electrodes 70.

The arrangement of the first and second electrodes 70 and 80 is not particularly limited and any arrangement useful in allowing the charged electrophoretic particles 50 to migrate to display a desired image can be used. With reference to FIG. 1, in order to allow the first electrodes 70 to significantly migrate in the in-plane direction of the sealing layer 60, the first and second electrodes 70 and 80 are arranged on the side closer to the substrate 10. However, in order to allow the first electrodes 70 to significantly migrate in the direction normal to the substrate 10, the first and second electrodes 70 and 80 may be arranged on both the side closer to the substrate 10 and the side closer to the support layer 30.

The sealing layer precursor 210 that is characteristic of the present invention will now be described in detail.

The sealing layer precursor 210 may contain any liquid or solid component for desirably forming the sealing layer 60, the component being soluble in the dispersion medium 40 and having low molecular weight. When the sealing layer precursor 210 contains such a component, the density of the sealing layer precursor 210 is not limited to one or less. This leads to an increase in the useful kinds of material for forming the sealing layer precursor 210. Alternatively, the component of the sealing layer precursor 210 need not be soluble in the dispersion medium 40, but may be dispersible in the dispersion medium 40; that is, the component may be capable of being dispersed into fine droplets therein.

The sealing layer precursor 210 has affinity to the support layer 30 and the partitions 20; hence, the sealing layer precursor 210 can be adsorbed on the support layer 30 and the partitions 20 when the dispersion 200 containing the sealing layer precursor 210 is in contact with the support layer 30 and the partitions 20. When the sealing layer precursor 210 is adsorbed on the support layer 30 and the partitions 20, the sealing layer precursor 210 is present at the interfaces between the dispersion 200 and the support layer 30 and the partitions 20; that is, the sealing layer precursor 210 is present in an oxygen-free atmosphere. This allows various types of ultraviolet-curable material to be used to prepare the sealing layer precursor 210. Furthermore, since the sealing layer precursor 210 is adsorbed, a film made of the sealing layer precursor 210 can be uniformly formed.

The sealing layer precursor 210 preferably has low affinity to the charged electrophoretic particles 50.

An amphipathic compound with hydrophilic units and hydrophobic units is typical of a component of the sealing layer precursor 210. The solubility or dispersibility of the amphipathic compound in the dispersion medium 40 and the affinity of the amphipathic compound to the support layer 30 and the like can be controlled by adjusting the molecular structure and/or molecular weight of the above units.

A triblock copolymer is an example of the amphipathic compound. The triblock copolymer has a structure in which a hydrophilic unit, a hydrophobic unit, and a hydrophilic unit are bonded to one another in that order or a structure in which a hydrophobic unit, a hydrophilic unit, and a hydrophobic unit are bonded to one another in that order.

Examples of the triblock copolymer include a copolymer having a structure in which a PEO unit, a PPO unit, and a PEO unit are bonded to one another in that order and a copolymer having a structure in which a PPO unit, a PEO unit, and a PPO unit structure are bonded to one another in that order, wherein PEO represents polyethylene oxide and PPO represents polypropylene. The former structure is herein referred to as a PEO-PPO-PEO structure and the latter structure is referred to as a PPO-PEO-PPO structure.

The solubility or dispersibility and affinity of these copolymers can be controlled by adjusting the length or molecular weight of the PEO units and the PPO units. A material with an amphipathic unit having a photopolymerizable group is also an example of the compound of the sealing layer precursor 210. Examples of the photopolymerizable group include an acrylate group and a maleimide group. The sealing layer precursor 210 may contain one or more materials.

The sealing layer precursor 210 preferably has polymerizable or cross-linkable sites. This is because the charged electrophoretic particles 50 can be securely confined in the hollows by solidifying the sealing layer precursor 210 by polymerization or cross-linking. The sealing layer precursor 210 is preferably cured in such a manner that the support layer 30 and the like are coated with the solidified sealing layer precursor 210 to form the sealing layer 60. This is because curing enhances both the mechanical strength of the sealing layer 60 and the adhesion of the sealing layer 60 to the partitions 20 and the like.

In the present invention, the sealing layer precursor 210 may further contain a material with an amphipathic unit having a polymerizable substituent such as a vinyl group, a methacrylic group, an acrylic group, or a maleimide group; a reactive substituent such as a hydroxyl group, a carboxylic group, an amino group, an isocyanate group, a halogen group, a vinyl group, an epoxy group, or a halocarbonyl group; or another substituent.

A particular technique for curing the sealing layer precursor 210 may be selected depending on the polymerizable or cross-linkable structure thereof. When the sealing layer precursor 210 has, for example, an ultraviolet-polymerizable group such as an acrylate group or a maleimide group, ultraviolet polymerization can be used to cure the sealing layer precursor 210.

When the sealing layer precursor 210 contains the copolymer having the PEO-PPO-PEO structure described above, the sealing layer precursor 210 may further contain an agent for cross-linking the copolymer. Dicumyl peroxide is an example of such a cross-linking agent. Furthermore, the following agent can be used: a cross-linking agent with a group (for example, an isocyanate group) capable of reacting with a hydroxyl group of the copolymer.

Furthermore, the organic molecules, which can be bonded to the sealing layer precursor 210, may be provided on the support layer 30 and/or the end portions of the partitions 20 as described above. For example, molecules with an isocyanate group may be provided on the support layer 30 and/or the like and then bonded to the copolymer having the PEO-PPO-PEO structure.

The sealing layer precursor 210 is described above using the ultraviolet-curable resin as a suitable example; however, another polymerizable compound may also be used. The adsorption techniques used herein can be categorized into physical adsorption and chemical adsorption. In physical adsorption the sealing layer precursor 210 is non-covalently bonded to the support layer 30 and the end portions of the partitions 20. Examples of non-covalent bonding include ionic bonding, coordinate bonding, hydrophilic bonding, hydrophobic bonding, hydrogen bonding, and acid-base bonding. The sealing layer precursor 210 is preferably adsorbed on the support layer 30 and the partitions 20 by selecting a sealing layer precursor 210 with appropriate affinity to the support layer 30 and the partitions 20.

On the other hand, in chemical adsorption the sealing layer precursor 210 is covalently bonded to the support layer 30 and the partitions 20 by chemical reaction. The chemical adsorption probably proceeds due to the gradient of the distribution of the sealing layer precursor 210 in the hollows. In order to form the covalent bond, the sealing layer precursor 210 may have two or more reactive substituents capable of reacting with the support layer 30 and the partitions 20. Alternatively, polymerizable groups may be provided on walls of the partitions 20 and a surface of the support layer 30 that is located close to the hollows and then such polymerizable groups are bonded to the sealing layer precursor 210 by chemical reaction.

When conducting physical adsorption, the sealing layer precursor 210 may contain high or low molecular weight molecules. When conducting chemical adsorption, the sealing layer precursor 210 preferably contains low molecular weight molecules or oligomers. Furthermore, in the physical adsorption, it is not necessary to determine the order for polymerizing or cross-linking the sealing layer precursor 210 and for bonding the sealing layer precursor 210 to the support layer 30 and the partitions 20. One or both of the physical adsorption and the chemical adsorption techniques may be used.

In the present invention, when the sealing layer 60 is formed by subjecting the sealing layer precursor 210 to polymerization, the sealing layer precursor 210 may contain a monomer. The monomer is not particularly limited and any monomer that is soluble in a dispersion medium 40 and usually used for polymerization may be used. Examples of the monomer include various types of vinyl monomers including styrenic monomers such as styrene, 2-methylstyrene, 3-methylstyrene, 4-methylstyrene, 2-ethylstyrene, 3-ethylstyrene, 4-ethylstyrene, 2-propylstyrene, 3-propylstyrene, 4-propylstyrene, 2-isopropylstyrene, 3-isopropylstyrene, 4-isopropylstyrene, 4-tert-butylstyrene, 2,3-dimethylstyrene, 3,4-dimethylstyrene, 2,4-dimethylstyrene, 2,6-dimethylstyrene, 2,3-diethylstyrene, 3,4-diethylstyrene, 2,4-diethylstyrene, 2,6-diethylstyrene, 2-methyl-3-ethylstyrene, 2-methyl-4-ethylstyrene, α-methylstyrene, 4-phenylstyrene, acetoxystyrene, methoxystyrene, ethoxystyrene, and butoxystyrene; (meth)acrylate monomers such as methyl(meth)acrylate, ethyl (meth)acrylate, propyl(meth)acrylate, isopropyl (meth)acrylate, and n-butyl(meth)acrylate; vinyl ether monomers such as vinyl methyl ether, vinyl ethyl ether, and vinyl isobutyl ether; vinyl ketone monomers such as vinyl methyl ketone, vinyl ethyl ketone, and vinyl hexyl ketone; N-vinyl monomers such as N-vinylpyrrole, N-vinylcarbazole, N-vinylindole, and N-vinylpyrrolidone; vinyl hydrocarbon monomers such as ethylene, butylene, and hexene; vinyl acetate; (meth)acrylonitrile; (meth)acrylamide; and halides of these monomers. Additional examples include monomers such as ethyl-2-(vinyloxy)ethoxyacetate, 2-(tert-butyldimethylsiloxy)ethyl vinyl ether, 2-(trimethylsiloxy) ethyl vinyl ether, and 2-vinyloxyethyl phthalamide. The monomers described above may be used alone or in combination.

The sealing layer precursor 210 may further contain a cross-linking agent as required. The cross-linking agent is effective in enhancing the strength of the sealing layer 60. Examples of the cross-linking agent include divinylbenzene, divinylnaphthalene, ethylene glycol di(meth)acrylate, diethylene glycol di(meth)acrylate, triethylene glycol di(meth)acrylate, tetraethylene glycol di(meth)acrylate, trimethylolpropane triacrylate, allyl (meth)acrylate, 1,3-butanediol di(meth)acrylate, 1,6-hexanediol di(meth)acrylate, hexanediol diglycidyl ether (meth)acrylate, N,N-divinylaniline, divinyl ether, and dicumyl peroxide. These compounds may be used alone or in combination. Therefore, the sealing layer 60 may contain a polymer having a repeating unit of a single monomer, a block copolymer having repeating units of different monomers, or a random copolymer having no repeating unit. Physical and/or chemical surface properties of pixels may be controlled depending on properties of a monomer used, whereby display properties of the electrophoretic display device and the display stability and memory thereof are controlled. In the present invention, the sealing layer precursor 210 may contain one or more materials.

The organic molecules, which can be bonded to the sealing layer precursor 210 and provided on at least one of the sealing layer 60 and the end portions of the partitions 20, will now be described. The organic molecules are fixed to at least one of the sealing layer 60 and the end portions of the partitions 20 by chemical bonding (for example, covalent bonding) or physical bonding (for example, non-covalent bonding) as described above. Chemical bonding is preferable. Therefore, to fix the organic molecules to the sealing layer 60 and/or the end portions of the partitions, at least one of the support layer 30 and the end portions of the partitions 20 have a reactive functional group, the organic molecules have a reactive functional group, and these reactive functional groups react with each other.

The reactive functional groups are not particularly limited and any reactive functional group that is chemically active may be used. Preferable examples of the reactive functional groups include, but are not limited to, a hydroxyl group, a carboxyl group, an amino group, an isocyanate group, a halogen group, a vinyl group, an epoxy group, and a halocarbonyl group. A preferable reactive functional group is selected such that it readily reacts with another reactive functional group. When at least one of the support layer 30 and the partitions 20 is made of a material, such as metal, having no reactive functional groups, an interlayer made of a material having a reactive group may be provided over at least one of the support layer 30 and the end portions of the partitions 20. Alternatively, reactive groups may be formed on at least one of the support layer 30 and the end portions of the partitions 20 by oxidation technique, such as UV ashing.

The organic molecules is bonded to the sealing layer precursor 210 by chemical bonding (for example, covalent bonding) or physical bonding (for example, non-covalent bonding). Chemical bonding is herein preferable.

When the organic molecules have a vinyl group or a polymerization initiation site, the sealing layer 60 can be bonded to the support layer 30 and the end portions of the partitions 20, while the sealing layer 60 is simultaneously formed by subjecting the sealing layer precursor 210 to polymerization. The polymerization initiation site may be any type of substituent having substantially the same structure as that of a known polymerization initiator conventionally used for radical polymerization, living radical polymerization, living cation polymerization, living anion polymerization, or the like.

As described above, the support layer 30 and the end portions of the partitions 20 are uniformly coated with the sealing layer precursor 210 in Step 3 (a coating step) and the sealing layer precursor 210 is then subjected to at least one of polymerization and cross-linking, whereby the sealing layer 60 is formed. Accordingly, by the inventive technique the density of the sealing layer precursor 210 is not particularly limited, the sealing layer precursor 210 may contain an ultraviolet-curable material or another material, and the sealing layer 60 can be uniformly formed.

In the above description, the support layer 30, the partitions 20, and the insulating layer 90 are covered with the sealing layer 60. However, the present invention is not limited to such a configuration. In another embodiment, only the following sections may be covered with a sealing layer 60: a face of a support layer 30 that is located close to (opposed to) a substrate 10 and end portions of partitions 20 that are located close to (adjacent to or abutting) the support layer 30.

Figure 3A:
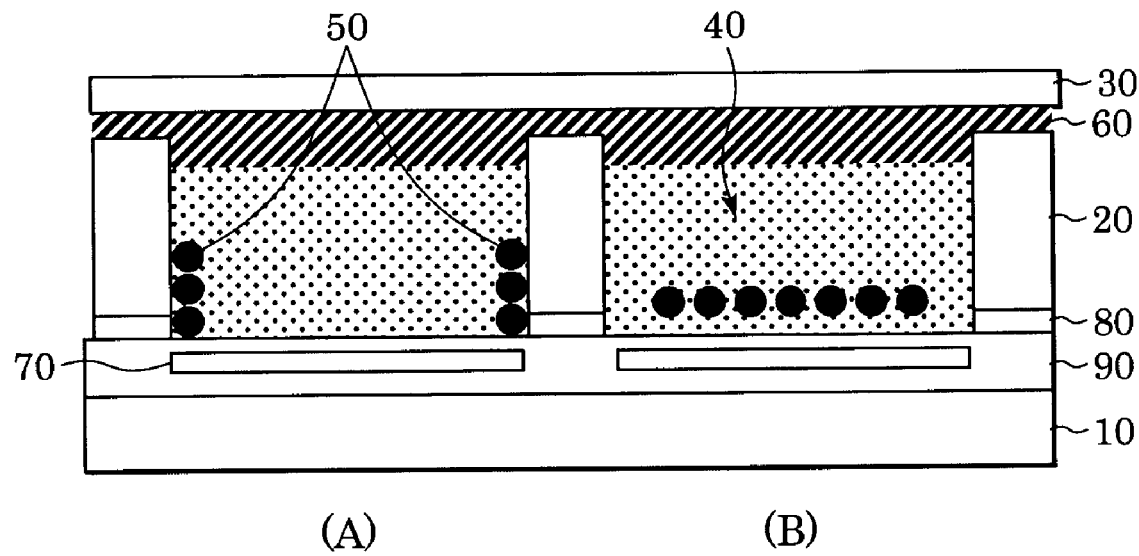
FIG. 3 is a schematic view showing a configuration of an electrophoretic display device according to a second embodiment of the present invention.
Figure 3B:
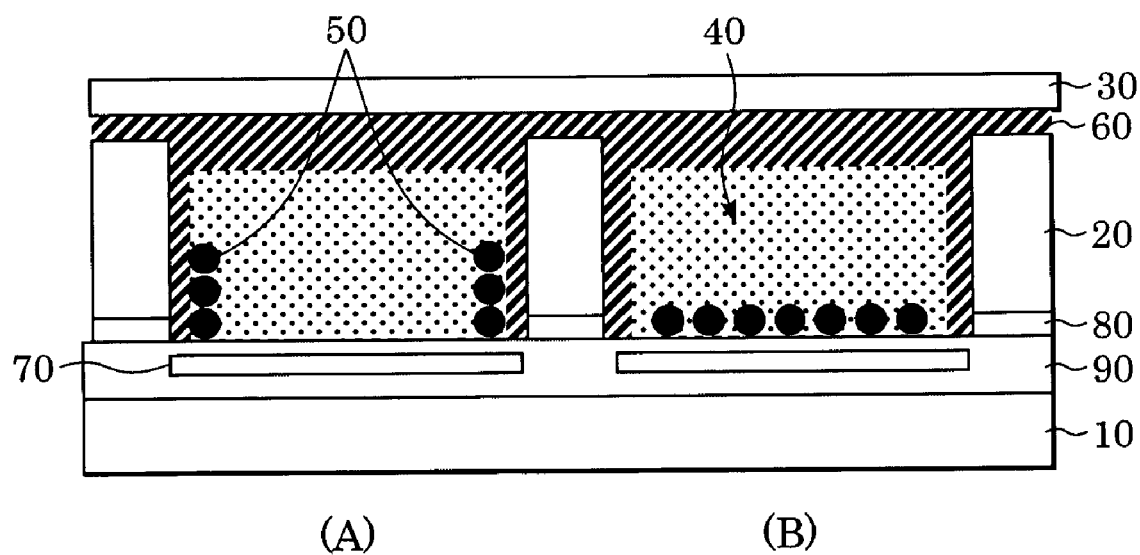

Therefore, the sealing layer 60 may be formed in Step 4 so as to cover only the face of the support layer 30 and the end portions of the partitions 20 as shown in FIG. 3A in such a manner that the sealing layer precursor 210 is adsorbed only on the face of the support layer 30 and the end portions of the partitions 20. Alternatively, the sealing layer 60 may be formed in Step 4 so as to cover the face of the support layer 30 and entire walls of the partitions 20 as shown in FIG. 3B in such a manner that the sealing layer precursor 210 is prevented from being adsorbed on the insulating layer 90.

EXAMPLES

Examples of the present invention will now be described. These examples are illustrative only and do not limit the present invention.

Example 1

In this example, an electrophoretic display device shown in FIG. 1 was prepared. With reference to FIG. 1, the electrophoretic display device includes pixels, each surrounded by partitions 20, having a size of 100 μm square. The partitions 20 form a grid pattern and have a width of 8 μm and a height of 20 μm. First electrodes 70 are each placed directly below the corresponding pixels and connected to switching elements, which are not shown. A second electrode 80 is placed between a substrate 10 and the partitions 20 and commonly used to drive all the pixels.

A method for manufacturing the electrophoretic display device of this example will now be described.

The switching elements, the first electrodes 70, and an insulating layer 90 were formed on the substrate 10 by a known photolithographic process, the second electrode 80 was formed on the insulating layer 90, and the partitions 20 were then formed on the second electrode 80 by, for example, a known lithographic process. After the partitions 20 were formed, a dispersion 200 containing charged electrophoretic particles 50, a dispersion medium 40, and a sealing layer precursor 210 was packed in hollows defined by the insulating layer 90 and the partitions 20 as shown in FIG. 2A.

In this example, the dispersion medium 40 was isoparaffin (Isopar™, manufactured by Exxon Mobil Corporation, having a density of 0.76) containing succinimide (OLOA™ 1200 manufactured by Chevron Chemical Company) acting as a charge control agent. The charged electrophoretic particles 50 were polymer beads which had an average particle size of about 1 to 2 μm, which were made of a polystyrene-polymethylmethacrylate copolymer, and which contained carbon black.

The sealing layer precursor 210 contained 95 parts by weight of a triblock copolymer (Pluronic™ PE 6100, manufactured by BASF Japan Ltd., having a density of one or more) having a PEO-PPO-PEO structure and five parts by weight of dicumyl peroxide. The content of Pluronic™ PE 6100 in the sealing layer precursor 210 was 1.5 mol/l.

After the dispersion 200 was packed in the hollows, a PET film with a thickness of 30 μm was provided on the partitions 20, whereby a support layer 30 was formed as shown in FIG. 2B. The support layer 30 placed on the partitions 20 was allowed to stand for one hour. During this operation, the sealing layer precursor 210 was adsorbed on the support layer 30, the partitions 20, and the insulating layer 90, that is, these members were coated with the sealing layer precursor 210 as shown in FIG. 2C.

The sealing layer precursor 210 was irradiated with ultraviolet light with an intensity of 30 mW/cm$^2$ at room temperature for 10 minutes, whereby the sealing layer precursor 210 was subjected to cross-linking. As a result, the sealing layer precursor 210 was cured, whereby the sealing layer 60 was formed as shown in FIG. 1.

Another electrophoretic display device prepared by the same procedure as described above was separated into pieces and then observed with an electron microscope. The observation showed that the sealing layer 60 was uniform; lay over the support layer 30, the partitions 20, and the insulating layer 90; and extended between the support layer 30 and the partitions 20.

The first electrodes 70 of that electrophoretic display device, which was not separated into pieces, were grounded and the potential of the second electrode 80 of the electrophoretic display device was then alternately charged to +15 V or −15 V at one Hertz (Hz). This allowed the electrophoretic display device to alternately display a black image or a white image in response to the change of the potential. Although this operation was repeated, the charged electrophoretic particles 50 were not observed to migrate beyond the partitions 20.

Furthermore, the dispersion medium 40 was not vaporized. That is, it was observed that the dispersion 200 was confined in the hollows surrounded by the partitions 20, the support layer 30, and the insulating layer 90. Although the electrophoretic display device was warped, the charged electrophoretic particles 50 were not observed to migrate beyond the partitions 20.

Example 2

A method for manufacturing an electrophoretic display device of this example includes the same steps as those described in Example 1, the steps being conducted prior to a step of forming partitions 20. In this example, the partitions 20 and an insulating layer 90 were surface-treated with a silane coupling agent (KBE-9007 manufactured by Shin-Etsu Chemical Co., Ltd.), terminated with an isocyanate group, by a known process.

A dispersion 200 containing charged electrophoretic particles 50, a dispersion medium 40, and a sealing layer precursor 210 was packed in hollows defined by an insulating layer 90 and the partitions 20 as shown in FIG. 2A. In this example, the dispersion medium 40 was isoparaffin (Isopar™, manufactured by Exxon Mobil Corporation, having a density of 0.76) containing succinimide (OLOA™ 1200, manufactured by Chevron Chemical Company) acting as a charge control agent. The charged electrophoretic particles 50 were polymer beads which had an average particle size of about 1 to 2 μm, which were made of a polystyrene-polymethylmethacrylate copolymer, and which contained carbon black.

The sealing layer precursor 210 contained a triblock copolymer (Pluronic™ PE 6100, manufactured by BASF Japan Ltd., having a density of one or more) having the PEO-PPO-PEO structure. The content of the triblock copolymer in the sealing layer precursor 210 was 1 mol/l.

After the dispersion 200 was packed in the hollows, a surface-modified PET film with a thickness of 30 μm was provided on the partitions 20, whereby a support layer 30 was formed as shown in FIG. 2B. The PET film was coated with the silane coupling agent.

The support layer 30 placed on the partitions 20 was allowed to stand for 30 minutes. During this operation, isocyanate groups present on the support layer 30 were allowed to react with hydroxyl groups of the copolymer. This allowed the copolymer to be bonded to the support layer 30, the partitions 20, and the insulating layer 90, whereby the sealing layer 60 was formed as shown in FIG. 1.

Another electrophoretic display device prepared by the same procedure as described above was separated into pieces and then observed with an electron microscope. The observation showed that the sealing layer 60 was uniform; lay over the support layer 30, the partitions 20, and the insulating layer 90; and extended between the support layer 30 and the partitions 20.

First electrodes 70 of that electrophoretic display device, which was not separated into pieces, were grounded and the potential of a second electrode 80 of the electrophoretic display device was then alternately charged to +15 V or −15 V at 1 Hz. This allowed the electrophoretic display device to alternately display a black image or a white image in response to the change of the potential. Although this operation was repeated, the charged electrophoretic particles 50 were not observed to migrate beyond the partitions 20.

Furthermore, the dispersion medium 40 was not vaporized. That is, it was observed that the dispersion 200 was confined in the hollows surrounded by the partitions 20, the support layer 30, and the insulating layer 90. Although the electrophoretic display device was warped, the charged electrophoretic particles 50 were not observed to migrate beyond the partitions 20.

Example 3

A method for manufacturing an electrophoretic display device of this example includes the same steps as those described in Example 1. The steps were conducted prior to a step of forming partitions 20. In this example, after the partitions 20 were formed, a dispersion 200 containing charged electrophoretic particles 50, a dispersion medium 40, and a sealing layer precursor 210 was packed in hollows defined by an insulating layer 90 and the partitions 20 as shown in FIG. 2A. The dispersion medium 40 was isoparaffin (Isopar™, manufactured by Exxon Mobil Corporation, having a density of 0.76) containing succinimide (OLOA™ 1200, manufactured by Chevron Chemical Company) acting as a charge control agent. The charged electrophoretic particles 50 were polymer beads which had an average particle size of about 1 to 2 μm, were made of a polystyrene-polymethylmethacrylate copolymer, and which contained carbon black.

The sealing layer precursor 210 contained 1H,1H,5H-octafluoropentyl acrylate (V-8F, manufactured by Osaka Organic Chemical Industry Ltd., having a density of one or more) used as an ultraviolet-curable material. The acrylate contained 3 percent by weight of a photopolymerization initiator (IRGACURE™ 184 manufactured by Ciba-Geigy Corporation).

After the dispersion 200 containing the sealing layer precursor 210 was packed in the hollows, a PET film, treated with ultraviolet light and ozone, having a thickness of 30 μm was provided on the partitions 20, whereby a support layer 30 was formed as shown in FIG. 2B.

After the support layer 30 placed on the partitions 20 was allowed to stand for one hour, the sealing layer precursor 210 was irradiated with ultraviolet light with an intensity of 30 mW/cm$^2$ at room temperature for three minutes. This irradiation step caused cross-linking of the sealing layer precursor 210. As a result, the sealing layer precursor 210 was cured, whereby the sealing layer 60 was formed as shown in FIG. 1.

Another electrophoretic display device prepared by the same procedure as described above was separated into pieces and then observed with an electron microscope. The observation showed that the sealing layer 60 was uniform; lay over the support layer 30, the partitions 20, and the insulating layer 90; and extended between the support layer 30 and the partitions 20.

First electrodes 70 of that electrophoretic display device, which was not separated into pieces, were grounded and the potential of a second electrode 80 of the electrophoretic display device was then alternately charged to +15 V or −15 V at 1 Hz. This allowed the electrophoretic display device to alternately display a black image or a white image in response to the change of the potential. Although this operation was repeated, the charged electrophoretic particles 50 were not observed to migrate beyond the partitions 20.

Furthermore, the dispersion medium 40 was not vaporized. That is, it was observed that the dispersion 200 was confined in the hollows surrounded by the partitions 20, the support layer 30, and the insulating layer 90. Although the electrophoretic display device was warped, the charged electrophoretic particles 50 were not observed to migrate beyond the partitions 20.

Example 4

The method for manufacturing an electrophoretic display device is substantially the same as that described in Example 1 except that a sealing layer precursor 210 contains a component different from that described in Example 1. The sealing layer precursor 210 contained a triblock copolymer (L61, manufactured by Asahi Denka Co., Ltd., having a density of one or more), having the PEO-PPO-PEO structure, with maleimide groups bonded thereto by a known process. Bonds between the copolymer and the maleimide groups were formed using hydroxyl groups of the copolymer. In this example, no polymerization initiator was used in contrast to Example 3. This is because the copolymer with the maleimide groups can be photopolymerized without using any polymerization initiator.

A dispersion 200 containing the sealing layer precursor 210 was packed in hollows defined by partitions 20. An insulating layer 90 and a PET film, treated with ultraviolet light and ozone and having a thickness of 30 μm, was then provided on the partitions 20, whereby a support layer 30 was formed as shown in FIG. 2B.

After the support layer 30 placed on the partitions 20 was allowed to stand for one hour, the sealing layer precursor 210 was irradiated with ultraviolet light with an intensity of 30 mW/cm$^2$ at room temperature for three minutes. This irradiation step caused the sealing layer precursor 210 to cross-link. As a result, the sealing layer precursor 210 was cured, whereby the sealing layer 60 was formed. FIG. 2(c) schematically shows this process. Another electrophoretic display device prepared by the same procedure as described above was separated into pieces and then observed with an electron microscope. The observation showed that the sealing layer 60 was uniform; lay over the support layer 30, the partitions 20, and the insulating layer 90; and extended between the support layer 30 and the partitions 20.

First electrodes 70 of that electrophoretic display device, which was not separated into pieces, were grounded and the potential of a second electrode 80 of the electrophoretic display device was then alternately charged to +15 V or −15 V at 1 Hz. This allowed the electrophoretic display device to alternately display a black image or a white image in response to the change of the potential. Although this operation was repeated, the charged electrophoretic particles 50 were not observed to migrate beyond the partitions 20. Furthermore, the dispersion medium 40 was not vaporized. That is, it was observed that the dispersion 200 was confined in the hollows. Although the electrophoretic display device was warped, the charged electrophoretic particles 50 were not observed to migrate beyond the partitions 20.

Example 5

The method for manufacturing an electrophoretic display device of this example includes the same steps as those described in Example 1, the steps being conducted prior to a step of forming partitions 20. In this example, the partitions 20 and an insulating layer 90 were subjected to UV ashing and then surface-treated with a silane coupling agent (KBE-502, manufactured by Shin-Etsu Chemical Co., Ltd., containing 3-methacryloxypropylmethyldimethoxysilane) having a methacrylic group by a known process.

A dispersion 200 containing charged electrophoretic particles 50, a dispersion medium 40, and a sealing layer precursor 210 was packed in hollows defined by the insulating layer 90 and the partitions 20 as shown in FIG. 2A. The dispersion medium 40 was isoparaffin (Isopar™, manufactured by Exxon Mobil Corporation, having a density of 0.76) containing succinimide (OLOA™ 1200 manufactured by Chevron Chemical Company) acting as a charge control agent. The charged electrophoretic particles 50 were polymer beads which had an average particle size of about 1 to 2 µm, which were made of a polystyrene-polymethylmethacrylate copolymer resin, and which contained carbon black. The sealing layer precursor 210 contained 95 parts by weight of lauryl methacrylate manufactured by Kishida Chemical Co., Ltd. and five parts by weight of di(3,5,5-trimethylhexanoyl) peroxide (PERYL™ 355 manufactured by NOF Corporation). The content of the sealing layer precursor 210 in the dispersion 200 was 20 g/l.

After the dispersion 200 containing the sealing layer precursor 210 was packed in the hollows, a PET film having a thickness of 30 µm was provided on the partitions 20, whereby a support layer 30 was formed as shown in FIG. 2B. The PET film had a face surface-treated with the silane coupling agent, the face being in contact with the dispersion 200.

The support layer 30 placed on the partitions 20 was allowed to stand at 70° C. for four hours. During this operation, methacrylic groups present on the support layer 30 were allowed to react with methacrylic groups of the sealing layer precursor 210. This allowed a triblock copolymer contained in the sealing layer precursor 210 to be fixed to the support layer 30, the partitions 20, and the insulating layer 90, thus forming a sealing layer 60. FIG. 2(c) schematically shows this process. Another electrophoretic display device prepared by the same procedure as described above was separated into pieces and then observed with an electron microscope. The observation showed that the sealing layer 60 was uniform; lay over the support layer 30, the partitions 20, and the insulating layer 90; and extended between the support layer 30 and the partitions 20.

First electrodes 70 of that electrophoretic display device, which was not separated into pieces, were grounded and the potential of a second electrode 80 of the electrophoretic display device was then alternately charged to +15 V or −15 V at 1 Hz. This allowed the electrophoretic display device to alternately display a black image or a white image in response to the change of the potential. Although the above operation was repeated, the charged electrophoretic particles 50 were not observed to migrate beyond the partitions 20. Furthermore, the dispersion medium 40 was not vaporized. That is, it was observed that the dispersion 200 was confined in the hollows. Although the electrophoretic display device was warped, the charged electrophoretic particles 50 were not observed to migrate beyond the partitions 20.

Example 6

The method for manufacturing an electrophoretic display device of this example includes the same steps as those described in Example 1, the steps being conducted prior to a step of forming partitions 20. In this example, the partitions 20 and an insulating layer 90 were subjected to UV ashing and then spin-coated with a solution containing hexamethylene diisocyanate, whereby isocyanate groups were provided on the partitions 20 and the insulating layer 90. The resulting partitions 20 and the insulating layer 90 were spin-coated with a toluene solution containing 10 percent by weight of azobis(cyanovaleric acid) and 0.1 percent by weight of α-picoline, whereby polymerization initiation sites were provided on the partitions 20 and the insulating layer 90. A PET film with a thickness of 30 µm was subjected to UV ashing and a face of the resulting PET film was subjected to the same steps as described above, the face being in contact with a dispersion medium 40, whereby polymerization initiation sites were provided on the PET film face.

A dispersion 200 containing charged electrophoretic particles 50, a dispersion medium 40, and a sealing layer precursor 210 was packed in hollows defined by the insulating layer 90 and the partitions 20 as shown in FIG. 2A. The dispersion medium 40 was isoparaffin (Isopar™, manufactured by Exxon Mobil Corporation, having a density of 0.76) containing succinimide (OLOA™ 1200 manufactured by Chevron Chemical Company) acting as a charge control agent. The charged electrophoretic particles 50 were polymer beads which had an average particle size of about 1 to 2 µm, which were made of a polystyrene-polymethylmethacrylate copolymer, and which contained carbon black. The sealing layer precursor 210 contained 95 parts by weight of lauryl methacrylate manufactured by Kishida Chemical Co., Ltd. and five parts by weight of hexanediol dimethacrylate manufactured by Wako Pure Chemical Industries, Ltd. The content of the sealing layer precursor 210 in the dispersion 200 was 20 g/l.

After the dispersion 200 containing the sealing layer precursor 210 was packed in the hollows, the PET film was provided on the partitions 20, whereby a support layer 30 was formed as shown in FIG. 2B.

The support layer 30 placed on the partitions 20 was allowed to stand at 70° C. for four hours. During this operation, the sealing layer precursor 210 was allowed to react with the polymerization initiation sites present on the support layer 30, the partitions 20, and the insulating layer 90, whereby a triblock copolymer contained in the sealing layer precursor 210 was fixed to the support layer 30, the partitions 20, and the insulating layer 90, thus forming a sealing layer 60. FIG. 2(c) schematically shows this process. Another electrophoretic display device prepared by the same procedure as described above was separated into pieces and then observed with an electron microscope. The observation showed that the sealing layer 60 was uniform; lay over the support layer 30, the partitions 20, and the insulating layer 90; and extended between the support layer 30 and the partitions 20.

First electrodes 70 of that electrophoretic display device, which was not separated into pieces, were grounded and the potential of a second electrode 80 of the electrophoretic display device was then alternately charged to +15 V or −15 V at 1 Hz. This allowed the electrophoretic display device to alternately display a black image or a white image in response to the change of the potential. Although this operation was repeated, the charged electrophoretic particles 50 were not observed to migrate beyond the partitions 20. Furthermore, the dispersion medium 40 was not vaporized. That is, it was observed that the dispersion 200 was confined in the hollows. Although the electrophoretic display device was warped, the charged electrophoretic particles 50 were not observed to migrate beyond the partitions 20.

Example 7

The method for manufacturing an electrophoretic display device of this example includes the same steps as those described in Example 1, the steps being conducted prior to a step of forming partitions 20. In this example, the partitions 20 and an insulating layer 90 were subjected to UV ashing and then spin-coated with a toluene solution containing a compound with a group, represented by chemical formula (1), acting as an initiation site for atom transfer radical polymerization, whereby initiation sites for atom transfer radical polymerization were provided on the partitions 20 and the insulating layer 90.

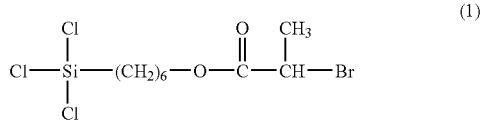
(1)

A face of a PET film with a thickness of 30 µm was subjected to the same steps as described above, the face being in contact with a dispersion medium 40, whereby initiation sites for atom transfer radical polymerization were provided on the PET film face.

A dispersion 200 containing charged electrophoretic particles 50, a dispersion medium 40, and a sealing layer precursor 210 was packed in hollows defined by the insulating layer 90 and the partitions 20 as shown in FIG. 2A. The dispersion medium 40 was isoparaffin (Isopar™, manufactured by Exxon Mobil Corporation, having a density of 0.76) containing succinimide (OLOA™ 1200 manufactured by Chevron Chemical Company) acting as a charge control agent. The charged electrophoretic particles 50 were polymer beads which had an average particle size of about 1 to 2 µm, which were made of a polystyrene-polymethylmethacrylate copolymer, and which contained carbon black. The sealing layer precursor 210 contained 95 parts by weight of lauryl methacrylate manufactured by Kishida Chemical Co., Ltd. and five parts by weight of hexanediol dimethacrylate manufactured by Wako Pure Chemical Industries, Ltd. The content of the sealing layer precursor 210 in the dispersion 200 was 20 g/l.

After the dispersion 200 containing the sealing layer precursor 210 was packed in the hollows, the PET film was provided on the partitions 20, whereby a support layer 30 was formed as shown in FIG. 2B.

The support layer 30 placed on the partitions 20 was allowed to stand at 70° C. for seven hours. During this operation, the sealing layer precursor 210 was allowed to react with the initiating sites present on the support layer 30, the partitions 20, and the insulating layer 90, whereby a triblock copolymer contained in the sealing layer precursor 210 was fixed to the support layer 30, the partitions 20, and the insulating layer 90, to form the sealing layer 60. FIG. 2(c) schematically shows this situation. Another electrophoretic display device prepared by the same procedure as described above was separated into pieces and then observed with an electron microscope. The observation showed that the sealing layer 60 was uniform; lay over the support layer 30, the partitions 20, and the insulating layer 90; and extended between the support layer 30 and the partitions 20.

First electrodes 70 of that electrophoretic display device, which was not separated into pieces, were grounded and the potential of a second electrode 80 of the electrophoretic display device was then alternately charged to +15 V or −15 V at 1 Hz. This allowed the electrophoretic display device to alternately display a black image or a white image in response to the change of the potential. Although the above operation was repeated, the charged electrophoretic particles 50 were not observed to migrate beyond the partitions 20. Furthermore, the dispersion medium 40 was not vaporized. That is, it was observed that the dispersion 200 was confined in the hollows. Although the electrophoretic display device was warped, the charged electrophoretic particles 50 were not observed to migrate beyond the partitions 20.

In the above description, a method for manufacturing an electrophoretic display device is used as an example of a method for manufacturing a display device for displaying an image by allowing fine particles to migrate. The present invention is not limited to such a method, but may be applied to other methods for manufacturing display devices for displaying an image by allowing fine particles to migrate.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-066387 filed Mar. 9, 2004, which is hereby incorporated by reference herein.

What is claimed is:

1. A method for manufacturing a display device having hollows containing fine particles for displaying an image by controlling the distribution of the fine particles, the hollows being defined by a substrate, a plurality of partitions arranged on the substrate, and a support layer placed on the partitions; the support layer having a face (i) opposed to the substrate and (ii) covered with a sealing layer; the partitions having end portions covered with the sealing layer, the method comprising:

a step of providing a dispersion in the hollows, the dispersion containing the fine particles, a dispersion medium and a sealing layer precursor containing an amphipathic compound, dissolved or dispersed in the dispersion medium for forming the sealing layer;

a step of providing the support layer on the partitions;

a step of extending the sealing layer precursor between the face of the support layer and the end portions of the partitions and allowing the face of the support layer and the end portions of the partitions to absorb the sealing layer precursor, the face of the support layer and the end portions of the partitions being in contact with the dispersion; and a step of forming the sealing layer by subjecting the coated precursor to at least one of polymerization and cross-linking.

2. A method for manufacturing a display device having hollows containing fine particles for displaying an image by controlling the distribution of the fine particles, the hollows being defined by a substrate, a plurality of partitions arranged on the substrate, and a support layer placed on the partitions; the support layer having a face (i) opposed to the substrate and (ii) covered with a sealing layer; the partitions having end portions covered with the sealing layer, the method comprising:

a step of providing a dispersion in the hollows, the dispersion containing the fine particles, a dispersion medium and a sealing layer precursor dissolved or dispersed in the dispersion medium for forming the sealing layer;

a step of providing the support layer on the partitions;

a step of extending the sealing layer precursor between the face of the support layer and the end portions of the partitions and allowing the face of the support layer and the end portions of the partitions to absorb the sealing layer precursor, the face of the support layer and the end portions of the partitions being in contact with the dispersion;

a step of forming the sealing layer by subjecting the coated precursor to at least one of polymerization and cross-linking; and a step of providing organic molecules, capable of bonding to the sealing layer precursor, on at least one of the face of the support layer and the end portions of the partitions.

3. A method for manufacturing a display device having hollows containing fine particles for displaying an image by controlling the distribution of the fine particles, the hollows being defined by a substrate, a plurality of partitions arranged on the substrate, and a support layer placed on the partitions; the support layer having a face (i) opposed to the substrate and (ii) covered with a sealing layer; the partitions having end portions covered with the sealing layer, the method comprising:

a step of providing a dispersion in the hollows, the dispersion containing the fine particles, a dispersion medium and a sealing layer precursor dissolved or dispersed in the dispersion medium for forming the sealing layer;

a step of providing the support layer on the partitions;

a step of extending the sealing layer precursor between the face of the support layer and the end portions of the partitions and allowing the face of the support layer and the end portions of the partitions to absorb the sealing layer precursor, the face of the support layer and the end portions of the partitions being in contact with the dispersion;

a step of forming the sealing layer by subjecting the coated precursor to at least one of polymerization and cross-linking; and a step of providing polymerization initiation sites on at least one of the face of the support layer and the end portions of the partitions.

4. The method according to claim 2, further comprising a step of providing organic molecules capable of bonding to the sealing layer precursor on the face of the support layer and the end portions of the partitions.

5. The method according to any one of the claims 1, 2 or 3, wherein the fine particles electrophoretically migrate when they are charged.

6. In a method for manufacturing a display device having hollows containing fine particles, said hollows defined by a support layer and an opposed substrate, and by opposed partitions carried by said substrate, the improvement by which a uniform hermetic seal is provided to seal the support layer, the substrate and the partitions forming the hollows, which comprises:

a step of providing organic molecules capable of bonding to a sealing precursor on a face of the support layer, the substrate and the end portions of the partitions;

a step of coating the opposed support layer and the substrate and end portions of the partitions with a sealing precursor; and extending the sealing layer precursor between the opposed support layer and the end portions of the partitions and a step of forming a uniform hermetic seal by subjecting the sealing precursor to either polymerization or cross-linking.

* * * * *